United States Patent [19]

Sugiyama et al.

[11] Patent Number: 4,744,069
[45] Date of Patent: May 10, 1988

[54] OPTICAL DISC APPARATUS WITH ACCESS SYSTEM HAVING OBJECT LENS CONTROL

[75] Inventors: Toshio Sugiyama, Aichi; Hideo Suenaga, Toyokawa, both of Japan

[73] Assignee: Hitachi, Ltd., Tokyo, Japan

[21] Appl. No.: 829,066

[22] Filed: Feb. 13, 1986

[30] Foreign Application Priority Data

Feb. 15, 1985 [JP] Japan ................................ 60-26208
Feb. 15, 1985 [JP] Japan ................................ 60-26209

[51] Int. Cl.⁴ ........................ G11B 7/08; G11B 7/095
[52] U.S. Cl. ...................................... 369/32; 369/44; 369/46
[58] Field of Search ...................... 360/77, 78; 369/30, 369/32, 33, 41, 43-46; 358/907, 342; 250/201, 202

[56] References Cited

U.S. PATENT DOCUMENTS

| | | | |
|---|---|---|---|
| 4,423,496 | 12/1983 | Opheij et al. | 369/46 |
| 4,467,462 | 8/1984 | Shibata | 369/45 |
| 4,504,937 | 3/1985 | Yonezawa et al. | 369/44 |
| 4,525,823 | 6/1985 | Sugiyama et al. | 369/44 |
| 4,563,760 | 1/1986 | Maeda et al. | 369/44 |
| 4,613,963 | 9/1986 | Hirano | 369/44 |
| 4,615,023 | 9/1986 | Inada et al. | 369/32 |
| 4,616,354 | 10/1986 | Yoshida | 369/44 |

FOREIGN PATENT DOCUMENTS 0099576 2/1984 European Pat. Off. ............ 369/46
59-185038 10/1984 Japan ................................ 369/45

Primary Examiner—Raymond F. Cardillo, Jr.
Assistant Examiner—Steven R. Garland
Attorney, Agent, or Firm—Antonelli, Terry & Wands

[57] ABSTRACT

An optical disc apparatus arranged so that a light beam from a laser light source is focused by an object lens and irradiated on an optical recording medium having thereon a mirror surface and tracks of a plurality of pits for recording data, and that a reflected beam from the recording medium is irradiated on an optical detector from which a signal on the recording medium is reproduced for maintaining a position of said object lens at an optical center axis by a tracking servo. The optical detector includes at least two adjacent photoelectric transducers providing outputs indicative of the reflected beam incident thereon, a device for producing a signal indicative of a difference between the outputs from the transducers, and a position detector for detecting the position of the object lens in a direction perpendicular to the tracks in cooperation with said difference producing device. The position detector includes a sampling arrangement for sampling the difference signal when the light beam is irradiated only on a non-pit portion of said mirror surface. Further, the optical detector includes a feedback loop for positioning the object lens at the optical center axis when the tracking servo is not properly operated at the time of accessing or by external disturbance.

10 Claims, 9 Drawing Sheets

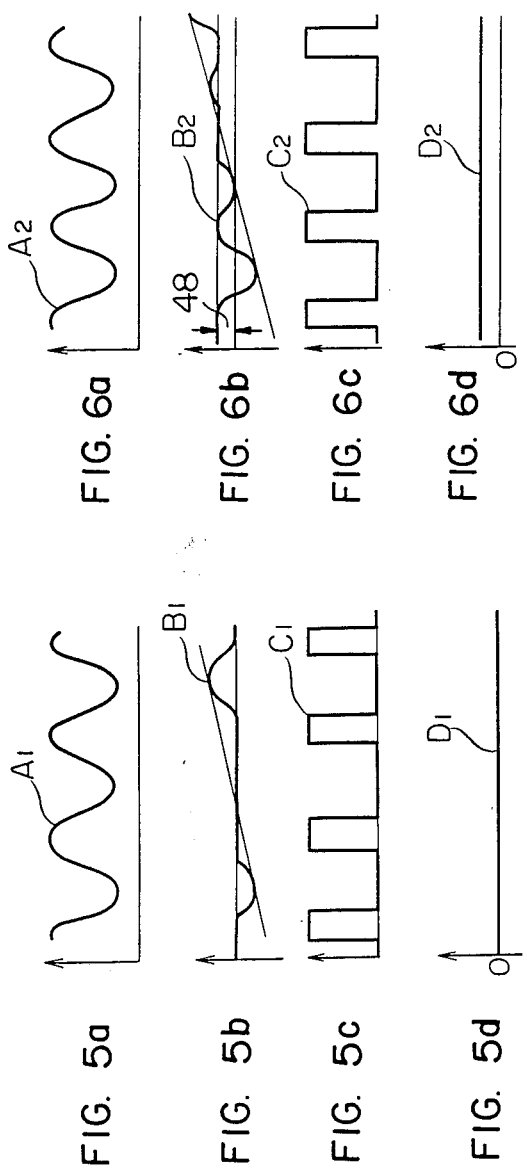

PIT IMAGE

BEAM SPOT

INTENSITY

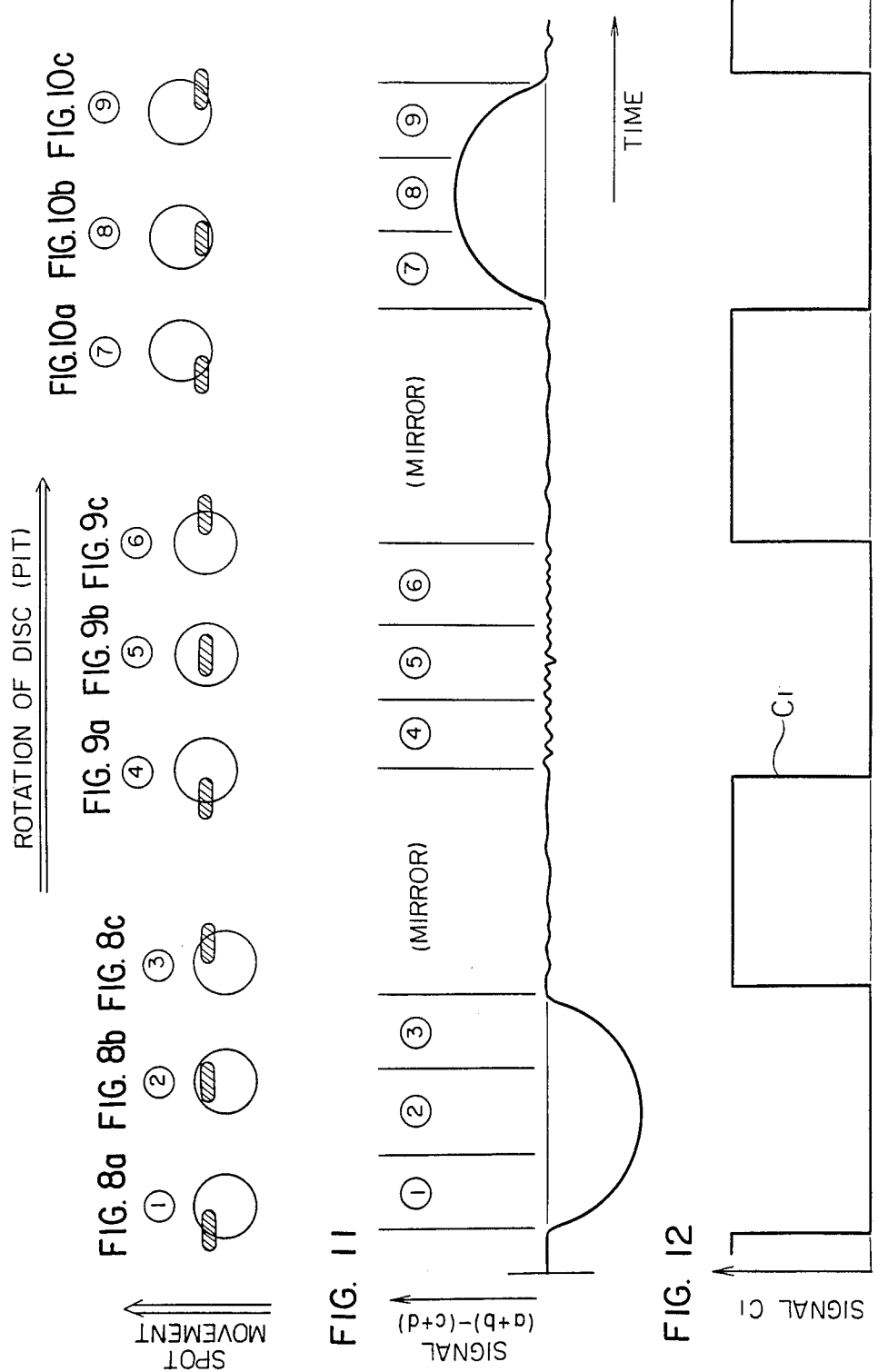

PIT IMAGE

7a'  7b'
44
7d'  7c'
BEAM SPOT  7
INTENSITY

FIG. 15b
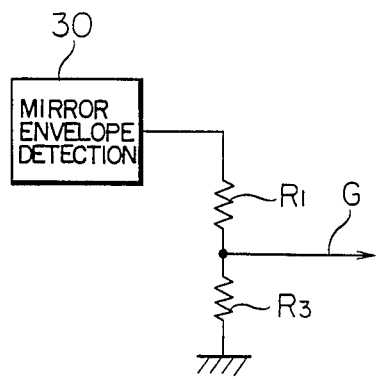
FIG. 16a
a+b+c+d
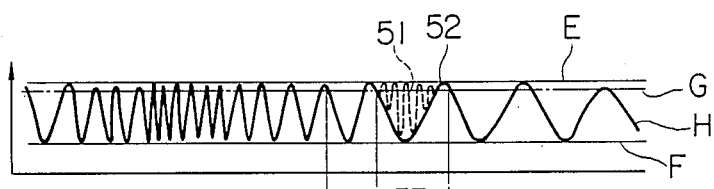
FIG. 16b
(a+b)−(c+d)
FIG. 16c
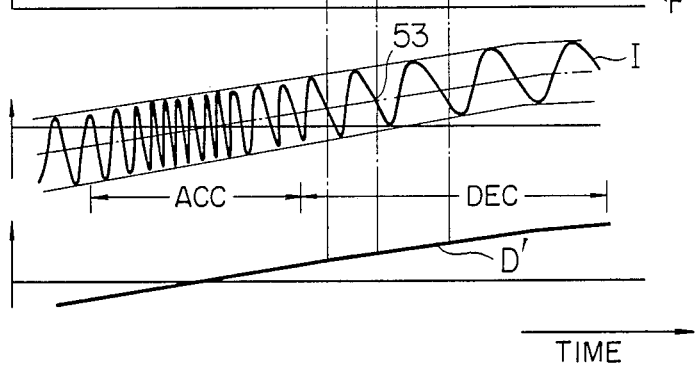
TIME

OPTICAL DISC APPARATUS WITH ACCESS SYSTEM HAVING OBJECT LENS CONTROL

BACKGROUND OF THE INVENTION

This invention relates to an access system in which the optical pickup of an optical-disc reproducing apparatus accesses a track on the disc, and particularly to an access system which enables the pickup to move at high speed, for high-speed accessing of a track without vibration of a lens.

There is known an actuator having an object to lens for an optical disc-reproducing apparatus, wherein the object lens is moved in the focus direction (optical-axis direction) in order for the light beam to be focused on the disc and the object lens is moved in the tracking direction (perpendicular to the optical axis) in order to follow a track on the disc. Servo technology which employs a feed-back circuit. Such as the tracking servo circuit disclosed in U.S. Pat. No. 4,525,823 titled "OPTICAL TRACKING SYSTEM" may be utilized for the device of the pickup in each direction. When the light spot is moved to one of the discontinuous positions on a rotating disc, a pickup is moved in the radius direction to make access to a different track under the condition in which the tracking servo system is cut off, and therefore, the object lens which is free, or movable on the pickup is vibrated in the track direction when the pickup is accelerated or decelerated. When the pickup arrived at the target track position to be accessed, the object lens is vibrated, resulting in poor pulling operation for tracking; that is, it follows that the light beam passing through the object lens when the tracking servo is again on, does not follow a certain track, takes a long time to follow or takes a different time to follow each time.

In addition, since pulling operation is uncertainly made somewhere in the tracking operation range of the lens, or since the pull operation is not always made at the position where the optical axis of the pickup is coincident with the center of the object lens held on the actuator of the pickup through the suspension, the amount of movement of the pickup sometimes actually varies over a large range of movement.

In order to cope with the above problem, a position sensor is attached to a movable portion of the actuator of the optical pickup so that the lens is controlled to be locked by the servo technics during access (when the pickup is travelling), as is disclosed in a digest of technical papers presented at the Topical Meeting on Optical Data Storage Optical Society of America, Apr. 18–20 1984, Montery, Calif., titled "A Fast Random Access Servo System Utilizing A Digital-Audio Optical Pickup" by Scott Hamilton, Tony Lavendender and Larry Dillard, FC-B4-1, and "A Two Axis Linear Servo Motor For Optical Recording" by Thomas E. Berg, FC-B2-1.

According to these citations, the actuator becomes very complicated in construction, and since the weight of the movable portion increases, there is a possibility that the basic performance of the actuator including the movable portion and a magnetic circuit for moving the movable portion is deteriorated.

SUMMARY OF THE INVENTION

It is an object of this invention to provide an access system which can remove the vibration of the object lens in the tracking direction which occurs upon movement of the pickup.

It is another object of this invention to provide an optical disc driving apparatus which can prevent the vibration of the object lens mounted on the pickup by detecting the position of the lens without addition of the position sensor to the actuator. The number of additional circuits are desired to be as small as possible.

According to this invention, together with the access operation of the lens made under the condition in which the tracking servo is cut off once, the light beam projected on the optical detector, when moved due to the inertia of the lens and the actuator having the lens mounted thereon, is detected and thereby the tracking servo system is operated to actuate a servo for prevention of vibration of the object lens. The optical detector is divided at least in connection with the information tracks into sub-detectors which are arranged apart from the conjugate point relative to the image of the disc track so that the displacement of the lens is detected by using the movement of the beam associated with the displacement of the lens in the tracking direction on the detector.

BRIEF DESCRIPTION OF THE DRAWINGS

FIGS. 5a to 5d and 6a to 6d are waveform diagrams for signal waveforms detected and calculated.

FIGS. 7a to 7d, 8a to 8c, 9a to 9c, 10a to 10c, 11, 12, and 13a to 13d are diagrams showing the relations among the position of the light beam spot, the light output and the converted electrical signal waveform.

FIGS. 14, 15a and 15b are block diagrams of other embodiments of this invention.

FIGS. 16a to 16c, are diagrams of electrical signal waveforms.

DESCRIPTION OF THE PREFERRED EMBODIMENTS

Figure 1A:
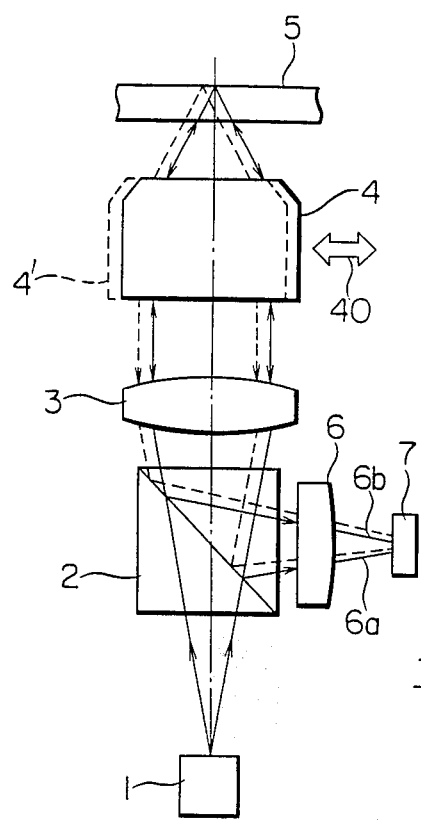
FIG. 1A shows a construction of the optical system of an embodiment of this invention.
Figure 4:
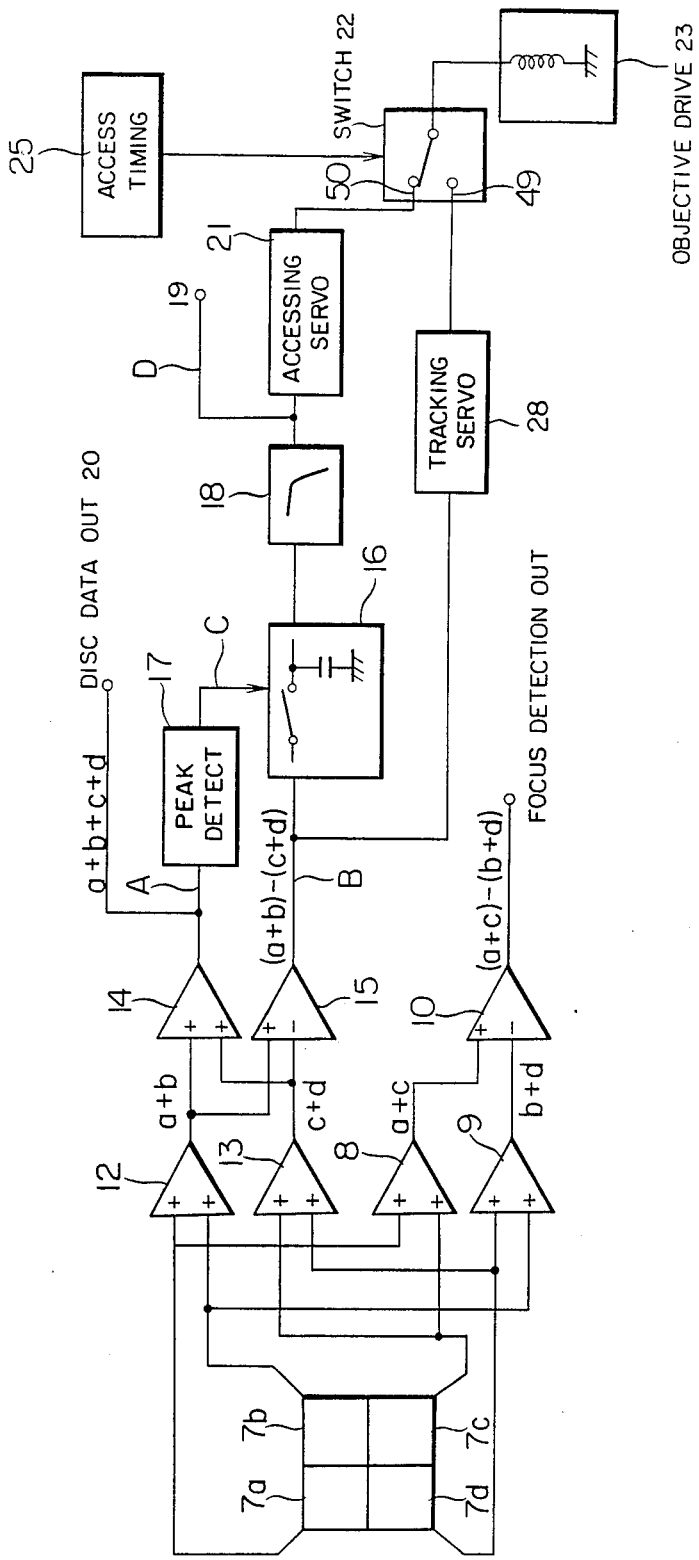
FIG. 4 is a circuit block diagram.

FIG. 1A shows a main part of one embodiment of an optical disc apparatus of the invention. Referring to FIG. 1A, the laser light emitted from a laser diode 1 is passed through a half prism 2, a collimator lens 3 and an object lens 4, thereby focused on an information track of an optical disc 5. The laser light reflected from this disc 5 is again passed through the object lens 4, and the collimator lens 3, reflected from the half prism 2 into a cylindrical lens 6 and then incident to an optical detector 7. The optical detector 7 is formed of four sections 7a to 7d shown in FIG. 1B. The focus-detected signals from the four sections are added and subtracted by operators 8 to 10 shown in FIG. 4, into $(7a+7c)-(7b+7d)$.

If, now, the object lens 4 is displaced up to a position 4' in an arrow-40 direction, the luminous flux is moved in an arrow-42 direction as indicated by a broken line 11' on the optical detector 7. Therefore, if the movement of a spot 11 of the luminous flux on the optical detector 7 is detected as described later and if a servo-control is actuated to decrease an amount of the movement, it is possible to suppress the movement of the object lens 4 due to an external disturbance.

Figure 1B:
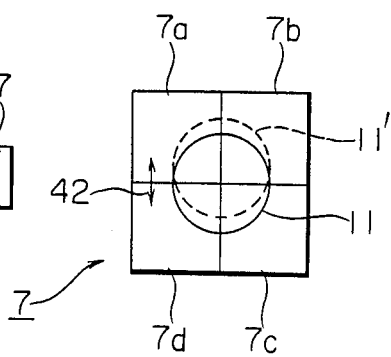
FIG. 1B shows a light sensitive portion of an optical detector.
Figure 2:
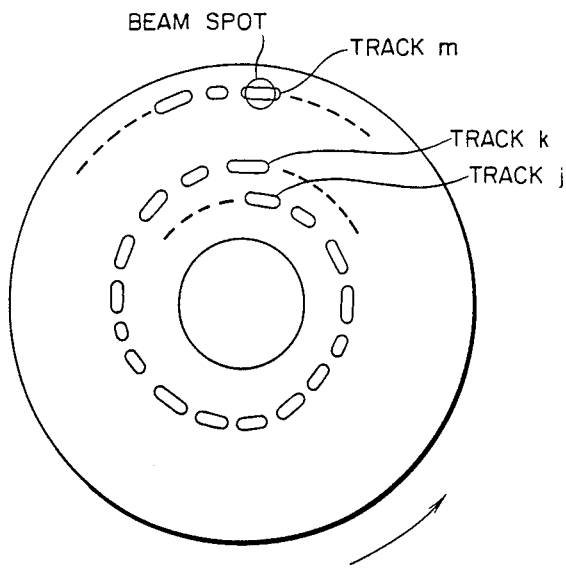
FIGS. 2 and 3a to 3c show pits and beam spots on a disc.
Figure 3A:
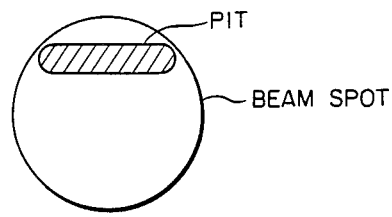
Figure 3B:
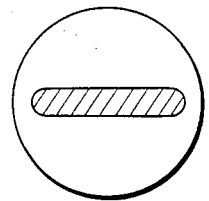
Figure 3C:
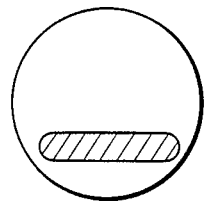

With reference to FIGS. 2, 4 and 5a to 5d, a description will be made of the case in which the beam spot crosses a track of the disc from the inside to the outside. If the object lens 4 is in the normal position as indicated by a solid line in FIG. 1A, the beam spot 11 is at the center on the optical detector 7 as shown in FIG. 1B by the solid line. The intensity of a DISC DATA OUT signal 20 produced through summing operational units 12, 13 and 14 is low when the beam spot is on one of the pits of any track m as shown in FIG. 2 by a small circle but it is high when the beam spot is at any position on the mirror between two pits, or between two adjacent tracks (for example, between tracks k and j shown in FIG. 2). This signal 20 is processed as main information (, or $7a+7b+7c+7d$). If the beam spot on the track j is moved toward the outer track m after the completion of one read/write operation by a pickup driven on the request of the access to the outer track m, it crosses a track on the disc and thus the intensity of the signal 20 changes as shown by $A_1$ in FIG. 5a. The troughs of the curve $A_1$ correspond to pits and the crests thereof to the mirror area. A peak detecting circuit 17 shown in FIG. 4 includes a comparator which detects the crests and supplies a pulse $C_1$ shown in FIG. 5c to a sample-and-hold circuit 16 having a switch function.

A subtracting operational unit, or a differential amplifier 15 supplies a signal indicative of the difference $((a+b)-(c+d))$ between the outputs of the summing operational units 12 and 13 to the other input of the sample-and-hold circuit 16. This signal is sampled at the high-level of the signal $C_1$ and the sampled B-input level just passed during the high-level interval of the signal $C_1$ is held during the low-level interval thereof. This circuit 16 can be formed of a combination of various sampling and holding circuits.

Figure 7A:
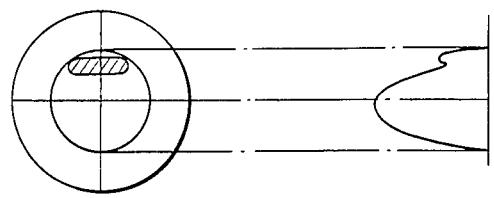
Figure 7B:
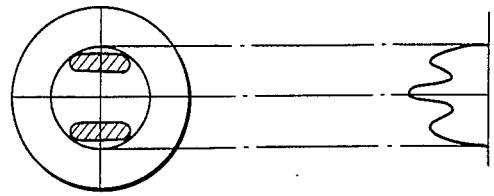
Figure 7C:
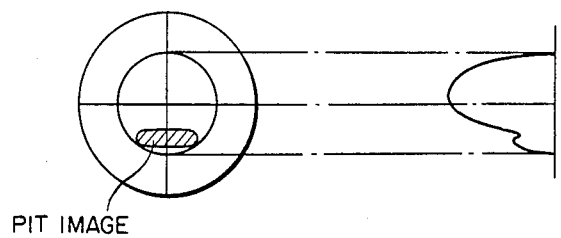
Figure 7D:
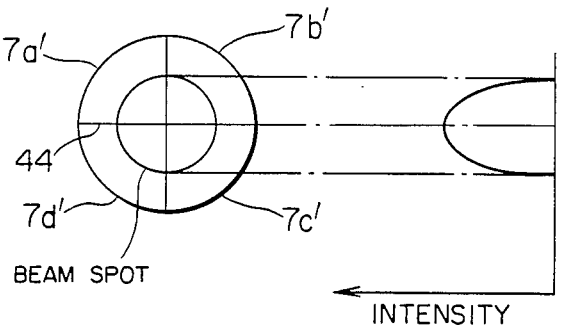
Figure 13A:
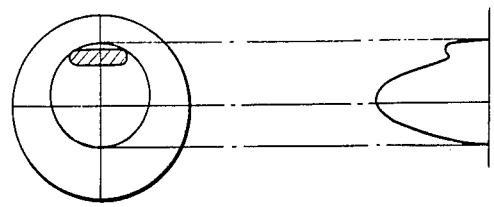
Figure 13B:
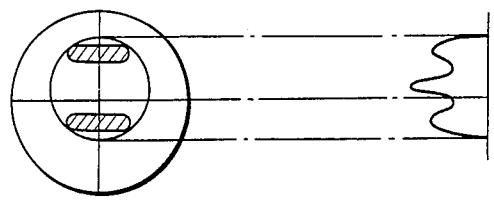
Figure 13C:
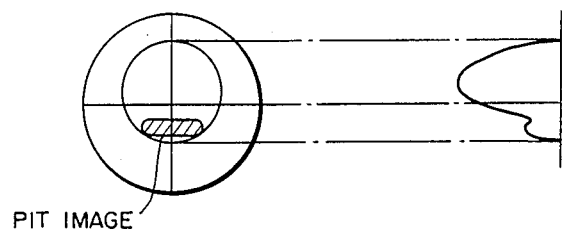
Figure 13D:
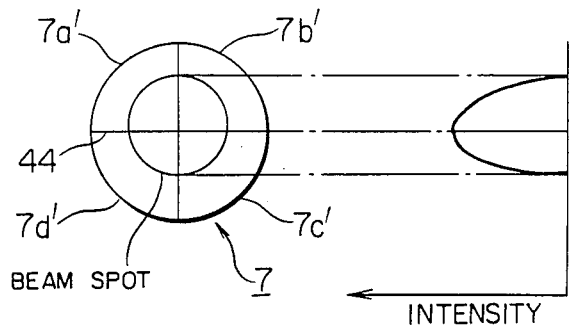

The change of the signal $((a+b)-(c+d))$ will be described with reference to FIGS. 7a to 7d, 8a to 8c, 9a to 9c, 10a to 10c, 11 and 12. Optical detectors $7a'$ shown in FIGS. 7a to 7d each are of a quadrant shape different from the square-shaped detectors 7a to 7d (FIG. 1B) but they produce outputs similar to those of the detectors 7a to 7d. If the beam spot is on the mirror area of the disc, the light intensity on the detector is symmetrical with respect to a straight line 44 separating the sub-detectors $7a'$, $7b'$ and sub-detectors $7d'$, $7c'$ as shown on the right-hand side of FIG. 7d, and therefore $a+b=c+d$. As a result, the signal $((a+b)-(c+d))$ becomes zero level as shown in FIG. 11 at the leftmost end. If the pits are moved right by the disc rotation, a pit enters into the outer (, or upper) portion of the beam spot as shown in FIGS. 8a to 8c when the beam spot is moved outward (or upward). At this time, the signal $((a+b)-(c+d)$ is less than zero, or $(a+b)-(c+d)<0$ as will be clear from the light intensity distribution on the detector shown on the right-hand side of FIG. 7a. That is, the signal $((a+b)-(c+d))$ takes the negative waveform as shown by ① to ③ in FIG. 11. If the pit goes out of the spot, the signal is again returned to zero level. If the spot is further moved outward, (or upward) on the disc, the next pit enters into the spot as the disc rotates. If the pit is on the center axis of the spot along the tangential direction of the track as shown in FIGS. 9a to 9c, the light intensity on the detector becomes symmetrical with respect to the axis 44 as shown on the right hand side of FIG. 7b. The two dark areas on the detector as indicated by hatched lines on the left-hand side of FIG. 7b are the image of the pit on the disc as shown by hatched areas in FIG. 9b. The separation of the image into the two dark portions is due to the diffraction phenomenon in the optical system shown in FIG. 1A. This diffraction phenomenon non is described in the specification of U.S. Pat. No. 4,006,293 titled "APPARATUS FOR READING A FLAT RECORD CARRIER WITH AN OPTICALLY READABLE INFORMATION STRUCTURE". The signal $((a+b)-(c+d))$ is substantially zero level through the periods of ④, ⑤ and ⑥ shown in FIGS. 9a to 9c. If the pit advances further right, away from the beam spot, the light intensity distribution becomes symmetrical as shown on the right-hand side of FIG. 7d and hence the signal $((a+b)-(c+d))$ becomes zero level. If the beam spot is moved outward, the next pit appears on the lower area of the beam spot as shown in FIGS. 10a to 10c. At this time, the dark pit image appears on the sub-detectors $7d'$ and $7c'$ of the detectors $7a'$ to $7d'$ as shown in FIG. 7c and hence the signal $(a+b)-(c+d)$ is larger than zero, or $(a+b)-(c+d)>0$. That is, the positive-wave signal as shown in FIG. 11 by ⑦, ⑧ and ⑨ is supplied to the input B of the sample-and-hold means 16. If the pit is rotated right and the beam spot is moved outward so that the pit goes out of the range of the beam spot, this signal is again zero level. FIG. 5b also shows the same waveform of the signal B1 as shown in FIG. 11, for the purpose of comparing it with the signal A1 shown in FIG. 5a.

As described above, when the object lens 4 is in the normal position, the output from the differential amplifier 15 is substantially zero as far as the beam spot is in the mirror area between the pits, or between the tracks. The circuit 16 is used to make this substantially zero voltage level be associated with the voltage levels produced during the periods, and ① to ③, ④ to ⑥, and ⑦ to ⑨ due to the pit lying on the spot. The high-frequency noise from the output of the circuit 16 is removed by a low-pass filter 18, which then produces an output D of stationary zero level as shown in FIG. 5d.

A description will be made of the case in which the object lens 4 is shifted up to position 4' in the arrow-40 direction of FIG. 1A. When the object lens is shifted up to position 4', the light beam path to the detector 7 is deviated as shown by a broken line 6b and thus the beam spot is shifted in the arrow-42 direction as shown by the broken line in FIG. 1B. Therefore, the light intensity distribution on the detector 7 changes as shown on the right-hand side of FIGS. 13a to 13d. Accordingly, the levels of the signals $((a+b)-(c+d))$ in all the cases are generally shifted, or make an offset in the positive direction. This offset will be changed with a period corresponding to the mechanical natural vibration frequency of the optical pickup system provided with the lens 4. A distance 48 shown by the opposite arrows in FIG. 6b is the offset included in the output which the differential amplifier 15 produces in accordance with the deviation of the beam spot on the detectors $7a'$ to $7d$ shown in FIGS. 13a to 13d. The change of signal B2 due to the existence of pit as well as the signal B1 is removed by the sample-and-hold circuit. In other words, the signal B2 from the differential amplifier is sampled and held by the sample-and-hold circuit in response to the signal $C_2$ resulting from the reflection of the beam spot from the mirror area, of the sum signal from the optical detector, and thereby the signal component of the input signal to the sample-and-hold circuit, which component results from the reflection of the beam spot from the pit, can be removed. This signal from the sample-and-hold circuit has an offset or a DC component (which changes in synchronism with the low vibration frequency of the lens 4) due to the shifting of the object lens.

Therefore, the cut-off frequency of the low-pass filter 28 is selected to be higher than the natural vibration frequency of the lens 4.

A switch 22 is provided to switch this offset to the tracking servo circuit system of the object lens. During the read/write period in which data is read from or written in the disc, the movable contact of the switch 22 is connected to the contact 49, to connect the tracking servo circuit 28 to an objective drive circuit 23. When a signal indicative of the period in which the pickup with the object lens 4 is travelled, or accessed to a desired track is supplied from the access timing circuit 25 to the switch 22, the movable contact is connected to the contact 50, so that a drive output for amplifying the offset signal according to the shift of the lens and restoring the lens to the normal position is supplied from an access servo circuit 21 to the objective drive circuit 23, thus completing access servo circuit to lock the objective.

Adding amplifiers 8 and 9 supply two signals (a+b) and (c+d), or the sums of diagonal quadrant detector outputs, to a differential amplifier 10. The differential amplifier 10 produces a signal (a+c)−(b+d) indicative of the difference between the sums and supplies it to a focus servo circuit (not shown) as a focus detected signal.

Figure 14:
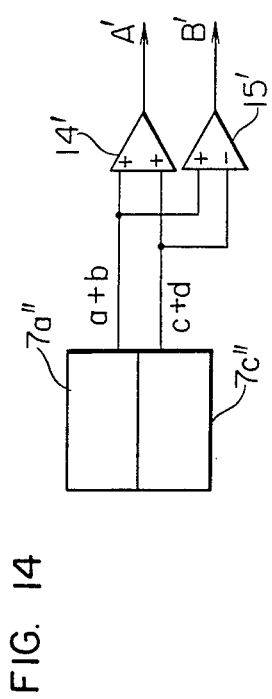

The invention of this application relates to the detection of the displacement of the objective on the optical pickup in the tracking control direction across a number of successive tracks so as to access to a desired track. This invention is also useful in the optical disc drive unit which does not make focus control except tracking control. FIG. 14 shows another embodiment of this invention which has a summing operational unit 14' and differential amplifier 15' connected to dual detector 7a", 7c". The output signals from both detectors are the same as those from the circuits 12 and 13 in FIG. 4.

Figure 15A:
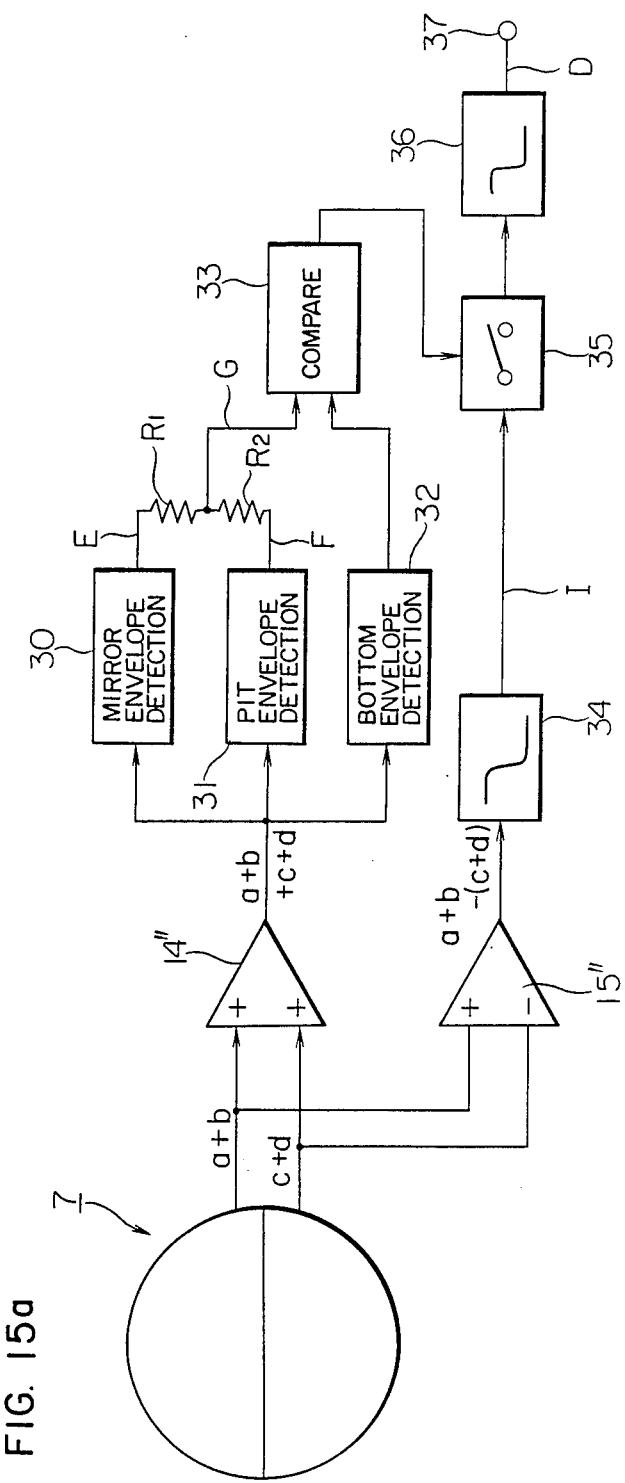

FIG. 15a shows still another embodiment of this invention. In this embodiment, two detectors are used shaped in a semi-circle and supply outputs of (a+b) and (c+d) to summing and differential amplifiers 14" and 15". The output from the circuit 14" changes in the low-level side direction since a single pit passes through the spot region as indicated by a broken line in FIG. 16a. If the spot lies in the mirror area between tracks, the output signal is of the waveform shown by 52 in FIG. 16a since there is no change toward low level. That is, the change shown by the broken line corresponds to the passage of one pit, and the change of signal shown by the solid line corresponds to the passage of one track. How many pit change waveforms there are during one-track change period is dependent on the ratio of the disc revolution rate to the travel speed of the beam spot. The output from the adder 14" (, or a+b+c+d) is supplied to a mirror envelope detecting circuit 30 for detecting the envelope of the high-level voltage of the signal, or the voltage at the mirror-side position, to an envelope detecting circuit 31 for detecting the output at the lower-side of signal change, or at pit side which cannot follow the superimposition of signals due to the passage of track, and to a bottom-side envelope detecting circuit 32 for detecting the output at the lower side of signal change, and following the superimposition of signals due to the passage of track. These envelope detectors 30, 31 and 32 produce outputs of waveforms E, F and H, respectively. The half outputs from the optical detector 7 are supplied to the differential amplifier 15" where they are subtracted, or (a+b)−(c+d) is produced. This subtracted output is further supplied to a low-pass filter 34, which removes its high-frequency component and produces an output waveform I. The output waveform I as illustrated is the result of the superimposition of a repetitive waveform caused at the time of crossing each track, on the component sloped up to the right due to the movement of the lens in the negative direction because the lens is moving. That is, it is necessary to remove the high-frequency component J due to the movement of the lens, from the output I by the low-pass filter 36. In this embodiment, the output wave I is sampled only when the beam spot is at the center between tracks, or on the guard track (mirror area) as indicated by one-dot chain line. This is because when the beam spot is on the guard track, the beam intensity is uniform on the optical detector 7. To make this sampling operation, the outputs E and F are divided by resistors $R_1$ and $R_2$, respectively and then added into a level G, which is compared with the output H by a comparator 33. The output waveform I is sampled at the time of the coincidence output from this comparator, or at the end of the period, H>G). The output from the sampling circuit 35 is supplied to a low-pass filter 36, which then produces a waveform D'. The period ACC shown in FIG. 16b is the period in which the object lens is moving in the direction in which the pickup moves, or the period in which acceleration is made. The output D' indicates the displacement of the lens. If the output D' is amplified by an access servo circuit and supplied to the lens, completing a feedback loop, the lens movement can be suppressed.

FIG. 15b shows still another embodiment, in which resistors $R_1$ and $R^3$ are connected between the output of the mirror side envelope detecting circuit and ground so as to provide a divided level G.

While each of the embodiments has been mentioned for the compact disc (CD) drive for music, it can be applied to the access servo circuit for computer-purpose optical disc. The computer-purpose optical disc is different from a spiral-track disc in that the tracks are formed separated from each other. In either disc, the movement of the optical pickup to the target track can be made by counting the number of times the waveform H changes as shown in FIG. 16a, that is, the number of tracks which the pickup passes across.

Also, each of the embodiment can be applied to the access servo circuit of video disc player, or to the other optical disc drive or CD ROM.

We claim:

1. An optical recording medium accessing apparatus arranged so that a light beam from a laser light source is focused by an object lens of an optical system and irradiated on an optical recording medium having thereon a mirror surface with at least one non-pit portion and tracks of a plurality of pits for recording data, and that a reflected beam from the recording medium is irradiated on an optical detector means, said optical detector means reproducing a signal recorded on the rercording medium, and tracking servo means responsive to said optical detector means for maintaining a position of said object lens at an optical center axis of the optical system, wherein said optical detector means comprises:

at least two adjacent photoelectric transducers providing outputs indicative of the reflected beam incident thereon;

means for producing a signal indicative of at least a difference between the outputs from said transducers;

means of detecting the position of said object lens in a direction perpendicular to said tracks in cooperation with said difference producing means, said detection means including sampling means for sampling the difference signal when said light beam is irradiated only on a non-pit portion of said mirror surface; and means forming a feedback loop for enabling positioning of said object lens at said optical center axis.

2. An optical recording medium accessing apparatus according to claim 1, wherein said sampling means includes sampling means for sampling the difference signal only at the non-pit mirror surface portion between the pits of said optical recording medium.

3. An optical recording medium accessing apparatus according to claim 1, wherein said object lens is provided with a lens drive by which said object lens is movable in the focus and tracking directions.

4. An optical recording medium accessing apparatus according to claim 1, wherein said sampling means includes sample means for sampling said difference signal from said difference producing means only at the position on a guard track between adjacent tracks of said optical recording medium.

5. An optical disc accessing apparatus comprising:
(a) divided optical detectors which are sensitive to a light beam that is used to optically read or write data from or on an optical disc through an object lens of an optical system, said optical disc having thereon a mirror surface and tracks of data pits;
(b) operational amplifiers for producing signals indicative of the sum and difference of outputs from said divide optical detectors;
(c) shift signal means for supplying a signal corresponding to an amount of movement from the optical center axis of the optical system during a period when said light beam is not irradiating said data pits when accessing a track in accordance with the outputs of said operational amplifiers; and
(d) feedback servo loop means connected to outputs of said shift signal means for positioning said object lens in the optical center axis of the optical system; wherein said divided optical detectors are formed of at least two sub-detectors each of which generates an electrical signal corresponding to the amount of light irradiated thereon, said operational amplifiers produce the sum and differnce signals, respectively, and said shift signal means includes sample-and-hold means for sampling and holding the difference signal from said operational amplifiers in response to the sum signal, and supplying the held difference signal to an access servo circuit, said optical disc accessing apparatus further comprising:

access timing means for supplying a signal indicative of the read/write mode in which disc data is read or written through said object lens and a signal indicative of the access mode in which said object lens is shifted to a desired track;

a tracking servo circuit for driving said object lens so that in the read/write mode, the light beam passing through said object lens is irradiated on a desired track; and said access servo circuit for driving said object lens so that in the access mode, said object lens is located at a predetermined position, and switch means connected to said tracking servo circuit and said access servo circuit so that the output from one of said circuits is supplied through said switch means to an object lens drive in response to the mode signals from said access timing means.

6. An optical disc accessing apparatus according to claim 5, wherein said samaple-and-hold means comprises:
peak detecting means for detecting the time zone in which said sum signal has peaks, and supplying a timing signal indicative of the time zone; and
a sample-and-hold circuit responsive to said difference signal and said timing signal to sample and hold said difference signal in the time zone of the peaks.

7. An optical disc accessing apparatus according to claim 5, wherein said shift signal means includes:
means responsive to said sum signal to produce a timing signal for the peaks corresponding to the irradiation of light beam on the mirror area between the tracks;
means responsive to said difference signal and said timing signal for holding said difference signal; and
said accessing servo circuit is responsive to the output from said hold means to holding said object lens in the normal position.

8. An optical disc accessing apparatus according to claim 7, wherein said peak timing means has a circuit for smoothing the signal level side wave corresponding to the dark pit of said sum signal by the frequency characteristic near the track pass frequency upon access.

9. An optical disc accessing apparatus according to claim 5, wherein said divided optical detectors are formed of 4 sub-detectors having two perpendicular boundary lines and which generate electrical signals corresponding to the amounts of light beam irradiated thereon through said object lens, and said operational amplifiers are formed of operational amplifiers for making the sums of the outputs of two diagonal pairs (a:c;b:d) of said 4 sub-detectors, and a differential amplifier for making the difference $(a+c)-(b+d)$ between the outputs of said two operational amplifiers.

10. An optical disc accessimg apparatus according to claim 5, wherein said optical system is arranged so that when said object lens is moved to cross disc tracks, the light beam spot on said optical detectors is moved in the direction perpendicular to the boundary line of said optical detectors.

* * * * *